(12) United States Patent
Real (10) Patent No.: US 6,359,794 B1
(45) Date of Patent: Mar. 19, 2002

(54) BATTERY BACKUP POWER SUPPLY

(75) Inventor: Richmond Andrew Real, Olean, NY (US)

(73) Assignee: Acme Electric Corporation, East Aurora, NY (US)

( * ) Notice: Subject to any disclaimer, the term of this patent is extended or adjusted under 35 U.S.C. 154(b) by 0 days.

(21) Appl. No.: 09/619,747

(22) Filed: Jul. 19, 2000

Related U.S. Application Data
(60) Provisional application No. 60/167,485, filed on Dec. 1, 1999.

(51) Int. Cl.[7] ............................ H02M 3/335; H02J 7/00
(52) U.S. Cl. ......................................... 363/17; 307/66
(58) Field of Search ........................... 363/17, 20, 141, 363/143, 144; 307/64, 65, 66

(56) References Cited

U.S. PATENT DOCUMENTS

| | | |
|---|---|---|
| 4,034,232 A | 7/1977 | LaVenture |
| 4,199,754 A | 4/1980 | Johnson et al. |
| 4,255,746 A | 3/1981 | Johnson et al. |
| 4,327,298 A | 4/1982 | Burgin |
| 4,549,131 A | 10/1985 | Kusazaki |
| 4,580,220 A | 4/1986 | Braun et al. |
| 4,665,501 A | 5/1987 | Saldin et al. |
| 4,672,228 A | 6/1987 | Swoboda |
| 4,673,825 A | 6/1987 | Raddi et al. |
| 4,677,366 A | 6/1987 | Wilkinson et al. |
| 4,694,194 A | 9/1987 | Hansel et al. |
| 4,709,318 A | 11/1987 | Gephart et al. |
| 4,719,550 A * | 1/1988 | Powell et al. ................. 363/37 |
| 4,728,808 A * | 3/1988 | Bet-Esh et al. ............... 307/66 |
| 4,748,341 A | 5/1988 | Gupta |
| 4,779,007 A | 10/1988 | Schlanger et al. |
| 4,985,819 A | 1/1991 | Mori et al. |
| 5,019,717 A | 5/1991 | McCurry et al. |
| 5,157,592 A | 10/1992 | Walters |
| 5,172,009 A | 12/1992 | Mohan |
| 5,229,650 A * | 7/1993 | Kita et al. ...................... 307/66 |
| 5,241,217 A * | 8/1993 | Severinsky ................... 307/64 |
| 5,291,383 A | 3/1994 | Oughton |
| 5,377,092 A | 12/1994 | Rowand, Jr. et al. |
| 5,381,554 A | 1/1995 | Langer et al. |
| 5,410,720 A | 4/1995 | Osterman |
| 5,457,377 A | 10/1995 | Jonsson |
| 5,532,523 A | 7/1996 | Tang |
| 5,598,089 A | 1/1997 | Shintomi |
| 5,600,540 A | 2/1997 | Blomquist |
| 5,602,462 A | 2/1997 | Stich et al. |
| 5,615,129 A | 3/1997 | Stich et al. |
| 5,635,773 A | 6/1997 | Stuart |
| 5,638,244 A | 6/1997 | Mekanik et al. |
| 5,642,002 A | 6/1997 | Mekanik et al. |
| 5,757,172 A | 5/1998 | Hunsdorf et al. |
| 5,760,495 A | 6/1998 | Mekanik |
| 5,764,504 A | 6/1998 | Brand et al. |
| 5,790,391 A | 8/1998 | Stich et al. |
| 5,811,895 A * | 9/1998 | Suzuki et al. ................ 307/125 |
| 5,814,898 A | 9/1998 | Chen et al. |
| 5,856,712 A | 1/1999 | Suzuki et al. |
| 5,892,431 A | 4/1999 | Osterman |
| 5,896,280 A | 4/1999 | Gucyski et al. |
| 5,901,057 A * | 5/1999 | Brand et al. ................. 363/144 |
| 5,961,604 A | 10/1999 | Anderson et al. |

\* cited by examiner

*Primary Examiner*—Rajnikant B. Patel
(74) *Attorney, Agent, or Firm*—Pearne & Gordon LLP

(57) ABSTRACT

An uninterruptible power supply includes an inverter provided with power from a utility and a battery. The battery is connected through a FET so that battery power is instantly supplied to the inverter through the intrinsic FET diode when the utility power fails. The battery discharge FET is operated by an oscillator driven control circuit. The inverter includes an amplitude circuit and a polarity circuit. The inverter amplitude circuit includes FET operated by driver circuits that ensure efficient switching. The phase shifted full bridge pulse width modulated amplitude circuit converts the input power to a pulse width modulated output representing the amplitude of the power supply voltage, which is switched by the polarity circuit and to obtain the desired output voltage polarity. A falling edge bleeder ensures that a decreasing output voltage magnitude follows the desired waveform.

36 Claims, 8 Drawing Sheets

FIG. 8

BATTERY BACKUP POWER SUPPLY

This application claims the benefit of Provisional Application 60/167,485 filed Dec. 1, 1999.

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This application claims the benefit of U.S. Provisional Application 60/167,485 filed Dec. 1, 1999.

This invention relates generally to the field of power supplies and specifically to an uninterruptible power supply (UPS) having an inverter.

Uninterruptible power supplies are used in many electrical and electronic systems to protect against loss or degradation of operation in the event of a utility power outage. Generally, a UPS system provides backup power for the protected system from a battery source that is charged by the utility power. It is desirable to utilize an efficient connection from the battery to the load when the utility power is not available. Power management is often part of the UPS system operation.

UPSs are used in many different applications, some of which demand particular output power waveforms from the UPS. Therefore, it is advantageous for a UPS to have a configurable output waveform. It is also advantageous for the UPS to operate from a wide variety of input voltages and frequencies.

One application of a UPS is for supplying power to cable telecommunications amplifiers. The UPS should also be able to interface with appropriate transponder monitoring systems. In addition, diagnostic information should be available to the user.

BRIEF SUMMARY OF THE INVENTION

The present invention provides a power supply including an inverter having a DC input and an AC output. First and second DC voltage sources are connected to the DC input. A rectifier and a switch are connected in parallel, wherein the rectifier and the switch are connected between the second voltage source and the DC input.

The invention also provides a power supply including an inverter having a DC input and an AC output, wherein the inverter includes an amplitude circuit connected to control amplitude of the voltage at the AC output and a polarity circuit connected to control polarity of the voltage at the AC output. A controller is connected to operate the amplitude circuit and the polarity circuit so as to obtain a desired waveform at the AC output.

The amplitude circuit includes controlled switches connected and operable to generate a pulse width modulated signal. The polarity circuit is connected to receive the pulse width modulated signal and control the polarity of the AC output. A transformer is connected to transfer energy from the amplitude circuit to the polarity circuit. First and second DC voltage sources are connected to the DC input. A rectifier and a switch are connected in parallel, wherein the rectifier and the switch are connected between the second voltage source and the DC input. The switch is controlled so as to close when the second DC voltage source supplies power to the inverter and to open when the first DC voltage source supplies power to the inverter. The switch has a control input and also includes a switch control circuit having a capacitor having a first terminal connected to the switch control input and a second terminal connected to the second voltage source; a voltage applied to the first capacitor terminal; a second controlled switch connected between the second capacitor terminal and ground; and an oscillator connected to operate the second controlled switch when the first controlled switch is to be closed. The switch is a FET and the rectifier is a body diode of the FET. The first DC voltage source is a full bridge DC-DC converter and the second DC voltage source is a battery. The battery is charged by the first DC voltage source.

The amplitude circuit provides a voltage across first and second amplitude circuit terminals and the polarity circuit includes a first pair of rectifiers connected in parallel and in opposition between the first amplitude circuit terminal and the power supply output, a second pair of rectifiers connected in parallel and in opposition between the second amplitude circuit terminal and the power supply output, and a respective controlled polarity switch connected in series with each of the rectifiers, the polarity switches being controlled so that only one of the polarity switches corresponding to each diode pair is closed at any time. The polarity circuit includes a controller for operating the controlled polarity switches such that one of the polarity switches corresponding with the first pair of rectifiers is operated coincidentally with one of the polarity switches corresponding with the second pair of rectifiers. The switches operated coincidentally correspond with rectifiers connected to permit current flow to a single node. The polarity circuit controller includes two transformers, wherein one of the transformers is connected to control two of the polarity switches corresponding with rectifiers connected to permit current flow to a single node and the other of the transformers is connected to control two other of the polarity switches. The polarity circuit controller includes an oscillator connected to control current through the transformer and a polarity signal connected to control current through the transformer, wherein the polarity signal is connected to ensure that only one of the two transformers is on at the same time. The polarity circuit controller includes a respective rectifier and filter connected between each polarity switch and the corresponding transformer. The polarity circuit controller includes a shut down circuit connected to selectively block current flow through the transformers. The amplitude circuit includes controlled switches connected and operable to generate a pulse width modulated signal at the amplitude circuit terminals. The polarity circuit is connected to receive the pulse width modulated signal and control the polarity of the AC output by operation of the polarity switches. The terminals are output terminals of a transformer. The transformer includes a center tap connected to ground. The inverter includes an energy dissipator selectively connected across the output of the power supply.

The inverter includes a bleeder resistor selectively connected across the output of the power supply. A switch is provided for selectively connecting the bleeder resistor across the output of the power supply and a bleeder control circuit for operating the switch wherein the bleeder control circuit is connected to permit current flow through the bleeder resistor when voltage at the AC output exceeds a desired amplitude. A switch is provided for selectively connecting the bleeder resistor across the output of the power supply and a bleeder control circuit for operating the switch wherein the bleeder control circuit is connected to permit current flow through the bleeder resistor when voltage at the AC output is ramping toward zero volts.

A resistor is connected across the power supply output and a controlled switch is connected in series with the resistor and operated responsive to a voltage across the power supply output to close the switch when the output voltage amplitude exceeds a specified value.

A resistor is connected across the power supply output and a controlled switch is connected in series with the resistor and operated responsive to a voltage across the power supply output to close the switch when the output voltage amplitude is ramping toward zero volts.

The amplitude circuit includes controlled switches for controlling current determining the output of the amplitude circuit and a gate driver for each controlled switch. The gate driver includes a controller connected to provide a voltage to a control terminal of the controlled switch and an energy storage device connected to apply a voltage to a control terminal of the switch when the controlled switch is to be closed and to discharge a voltage from the control terminal switch when the controlled switch is to be opened. A transformer is connected between the controller and the controlled switch wherein the controller is a pulse width modulator. The energy storage device comprises a first capacitor connected to apply the voltage to the control terminal of the controlled switch and a second capacitor connected to discharge the voltage from the control terminal of the controlled switch. The controlled switch is a FET and the first capacitor is connected between a gate and a source of the FET by a second controlled switch that is closed when the controller applies a positive voltage to the gate and the second capacitor is connected between the gate and the source of the FET by a third controlled switch that is closed when the controller applies a negative voltage to the gate.

The amplitude circuit includes a FET having a gate and a source for controlling output voltage. A gate driving circuit for controlling the FET includes a first capacitor connected between the gate and the source; a first switch connected in series with the first capacitor;

a second capacitor connected between the gate and the source; and a second switch connected in series with the second capacitor, wherein the first and second switches are turned on alternately so that when the first switch is closed, a charge on the first capacitor applies a voltage to the gate and when the second switch is closed, the second capacitor discharges a voltage from the gate.

Another aspect of the invention provides a battery discharge circuit for connecting a battery to a load including a diode connected between the battery and the load and a controlled switch connected in parallel with the diode.

Another aspect of the invention provides a voltage bleeder including two terminals; a resistor connected across the two terminals; and a controlled switch connected in series with the resistor and operated responsive to a voltage across the terminals to close the switch when the voltage amplitude exceeds a specified value.

Another aspect of the invention provides a gate driver including a FET having a gate and a source; a first capacitor connected between the gate and the source; a first switch connected in series with the first capacitor; a second capacitor connected between the gate and the source; and a second switch connected in series with the second capacitor, wherein the first and second switches are turned on alternately so that when the first switch is closed a charge on the first capacitor applies a voltage to the gate and when the second switch is closed the second capacitor discharges a voltage from the gate.

DESCRIPTION OF THE INVENTION

Figure 1:
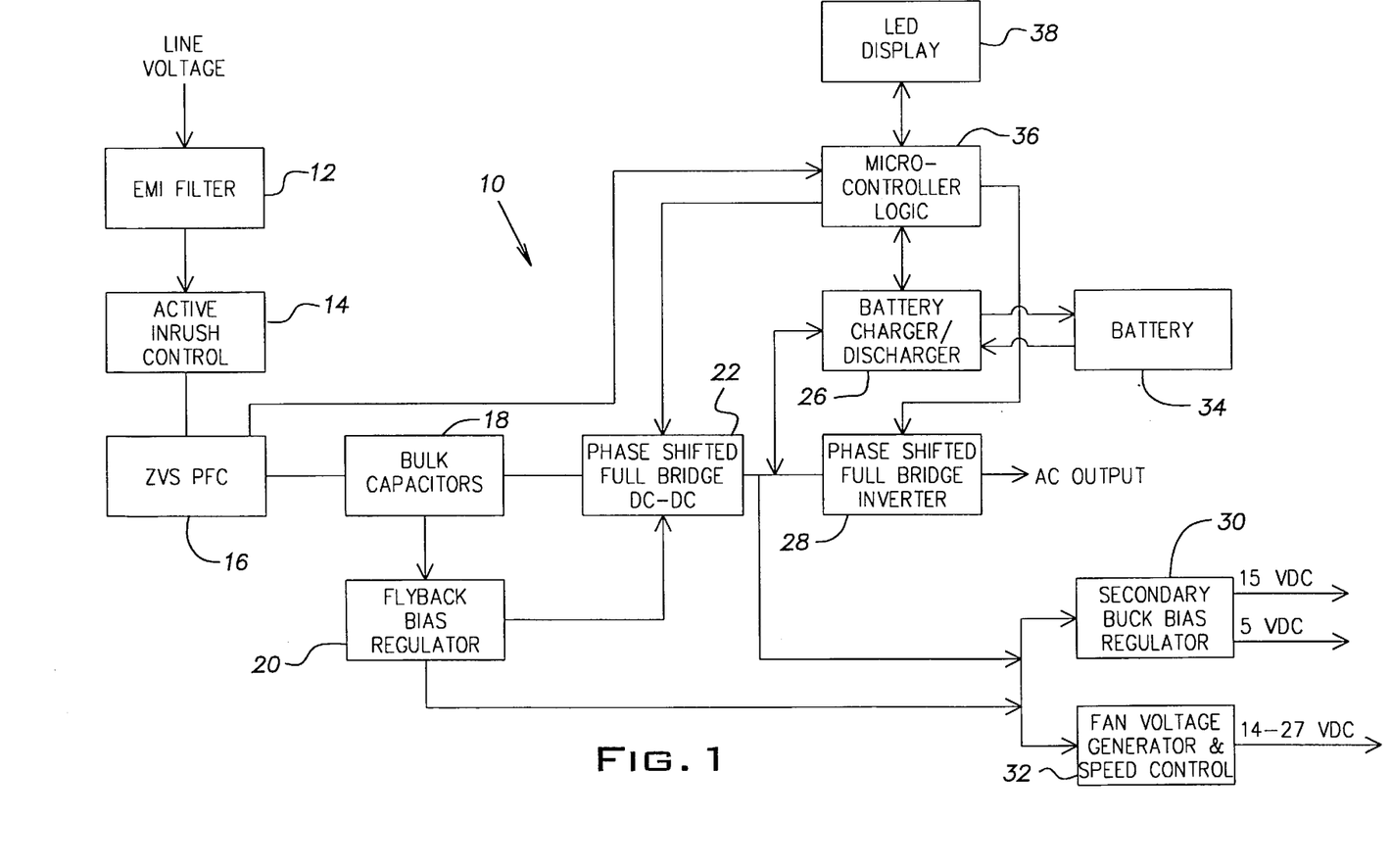
FIG. 1 shows a schematic block diagram of a power supply according to the invention.
Figure 2:
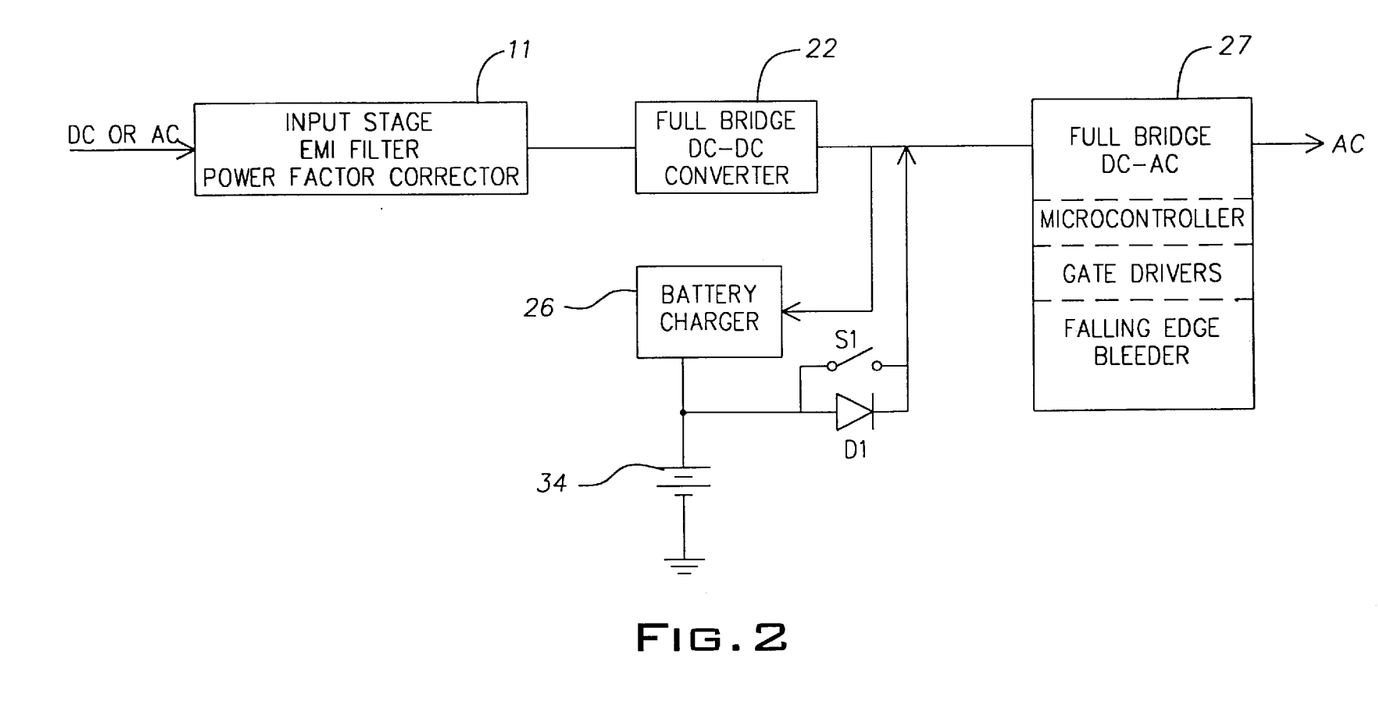
FIG. 2 shows a simplified schematic block diagram of the power supply of FIG. 1.

Referring to FIGS. 1 and 2, a power supply 10 according to the invention is provided with line voltage from any suitable source. Most commonly, line voltage will be 120 VAC at 60 Hz from a commercial utility. The line voltage can, however, range from 85 to 264 VAC at any frequency from DC to 400 Hz. The line voltage is input to an input stage 11 of the power supply. The input stage includes an EMI filter 12. A resistor/relay active inrush control 14 at the EMI filter output prevents excessive current inrush to the power supply. The active inrush control 14 includes a resistor and relay connected in parallel. A high efficiency zero voltage switching (ZVS) power factor corrector (PFC) 16 boosts the line voltage to a desired AC bulk power voltage. The AC bulk power is a DC voltage with an AC ripple. For cable telecommunications amplifiers, the AC bulk power is nominally 400 VDC. The PFC presents a 0.99 or better power factor at full load to the power line. The PFC senses line voltage and shapes the input current to match it. The PFC supports the AC bulk voltage through limited brownouts. If the AC line voltage is lost or drops too low for too long, the PFC 16 sends a signal indicating an insufficient line voltage condition.

The AC bulk power is supported by electrolytic bulk capacitors 18. After the bulk capacitors 18 are charged through the inrush control 14 resistor, the inrush control relay is closed to short circuit the resistor. A flyback bias regulator 20 runs off of the AC bulk power, and provides initial bias required to start the power supply. A phase shifted full bridge (PSFB) converter 22 converts the AC bulk to an inverter bulk power. The inverter bulk power can be maintained at any desired voltage. For cable telecommunications amplifiers, the inverter bulk power is regulated to a constant 59 VDC by the converter 22. Under battery power, the inverter bulk power is normally maintained a range of 40–60 VDC. This converter provides full isolation to meet UL, CSA, and TUV requirements for an outdoor environment. The inverter bulk power feeds four sections: a battery charger/discharger 26, an inverter section 27 including a phase shifted full bridge inverter 28, a secondary bias regulator 30, and a fan voltage generator & speed controller 32. The bias regulators 20, 30 and fan voltage generator provide power for various internal control and logic functions.

The battery charger/discharger 26 charges external batteries 34 when the line voltage is adequate and provides power from the batteries to the inverter 28 when the line voltage is inadequate. Current from the battery during discharge flows through a discharge switch S1, such as a FET and its corresponding body diode D1 as shown in FIG. 2. Charging and discharging are controlled by a microcontroller.

The inverter 28 generates an AC waveform having an arbitrary waveform determined by a microcontroller section 36. Power to the inverter can be provided as DC in any of several forms including battery power, rectified AC, or pulse width modulated DC. A falling edge bleeder 37 section is connected across the AC output of the inverter 28.

All microcontroller controlled functions can be handled by a single microcontroller or by several microcontrollers dedicated to specific functions of the power supply. In one implementation, two microcontrollers are used. One microcontroller controls the inverter for output wave shaping and controls the battery charger/discharger. Another microcontroller includes user configurable logic for user interface and communication with a variety of transponders used by the cable telecommunications industry. Analog and digital hardware circuitry can also be used to configure system logic. An I2C common serial bus is used by the microcontrollers to communicate with each other and an internal EEPROM memory. An alphanumeric LCD display 38 provides diagnostic and other information about the power supply to a user.

Figure 3A:
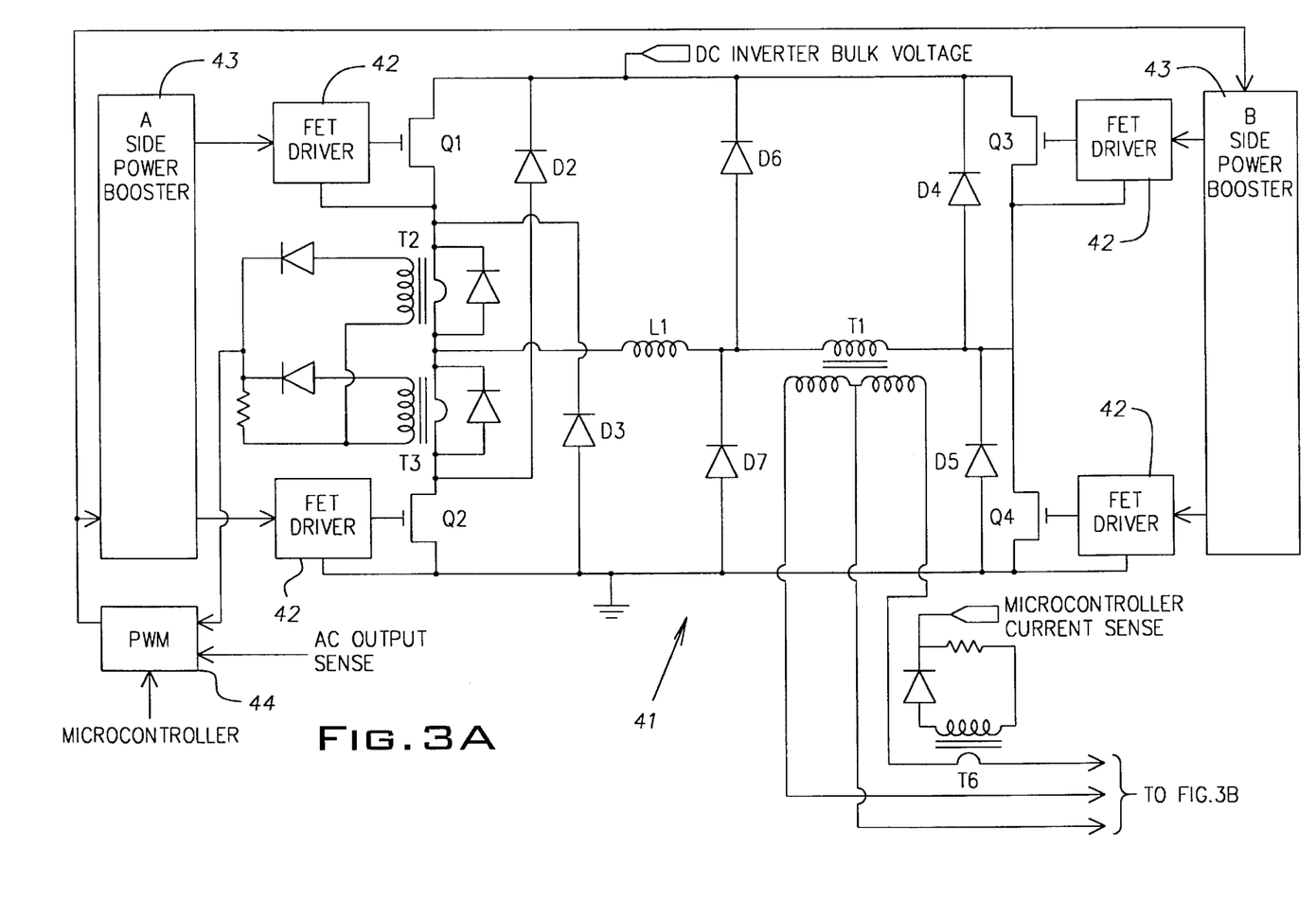
FIG. 3A shows a schematic diagram of the amplitude circuit of the phase shifted, full bridge inverter of the power supply.
Figure 3B:
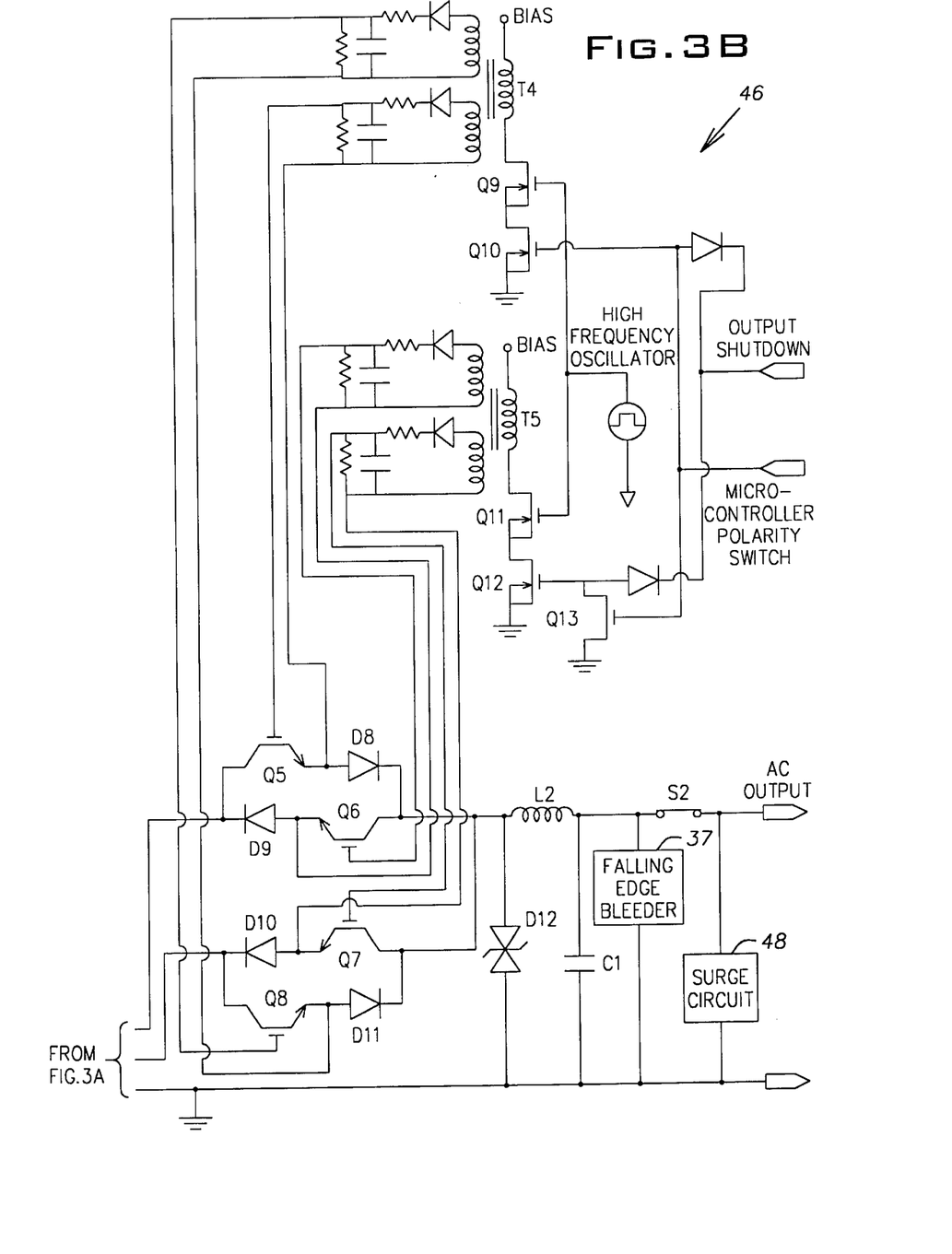
FIG. 3B shows a schematic diagram of the polarity circuit of the phase shifted, full bridge inverter of the power supply.
Figure 4:
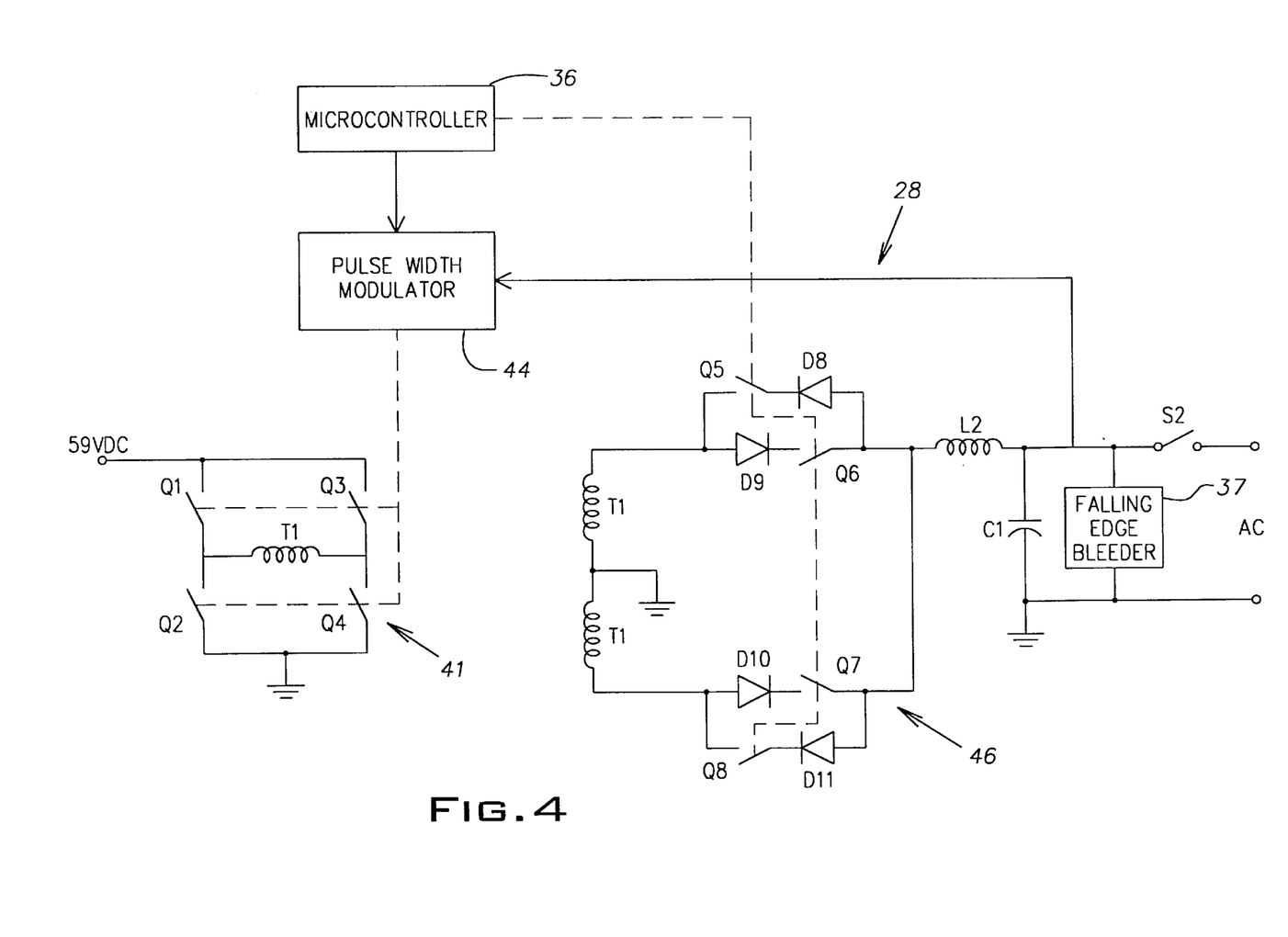
FIG. 4 shows a simplified schematic diagram of the phase shifted, full bridge inverter of FIGS. 3A and 3B.

Referring to FIGS. 3A, 3B, and 4, the inverter 28 includes an amplitude circuit 41 and a polarity circuit 46. The amplitude circuit 41 generates a pulse width modulated output that determines the voltage amplitude of the inverter output. The amplitude circuit includes four FETs Q1–Q4 operated by corresponding FET gate drivers 42. The FET drivers 42 are operated by A side and B side power boosters 43 based on a signal from a pulse width modulator (PWM) 44 controlled by the microcontroller 36. As schematically shown in FIG. 4, the FETs Q1–Q4 are operated as switches. The drains of the FETs Q1 and Q3 are connected to the inverter bulk power and their respective sources are connected across the primary of a transformer T1. The sources of the FETs Q2 and Q4 are connected to ground and their respective drains are connected across the primary of the transformer T1. In practice, as shown in FIG. 3A, two of the FETs Q1 and Q2 have their sources connected to the transformer T1 through an inductor L1 and respective current sensors T2, T3. The current sensors include respective transformers each having a diode connected in parallel therewith. The current sensors provide inverter current signals to the PWM 44 for analog control. The current signals are used to regulate the inverter and prevent saturation of the transformer T1. If an overcurrent condition is sensed, an alarm is activated. The current signal is also used for operation in a current control mode.

Diodes D2–D5 are connected across each of the FETs Q1–Q4. A diode D6 is connected between the inverter bulk voltage and a node between the transformer T1 and the inductor L1. A diode D7 is connected between ground and the node between the transformer T1 and the inductor L1. The transformer T1 secondary has a center tap connected to ground. The microcontroller 36 generates a reference voltage for the PWM 44. The PWM controls operation of the FETs Q1–Q4 to generate a pulse width modulated output from the transformer T1 output. The energy in the transformer output determines the energy in the AC output of the inverter. Thus, the transformer T1 output determines the absolute value of the power supply output voltage. The PWM 44 senses AC output voltage and compares it to the reference voltage from the microcontroller. The PWM controls the transformer T1 output to obtain the desired voltage amplitude.

A current sensor including a transformer T6 is connected on the secondary side of the transformer T1. The current sensor sends a current signal to the microcontroller for display on the LCD 38 and for internally monitoring the output current on the power supply.

The inverter 28 includes a polarity circuit 46 having polarity switches Q5–Q8 connected between the transformer T1 secondary and the power supply output. The polarity switches Q5–Q8 are NPN insulated gate bipolar transistors. Each polarity switch Q5–Q8 is connected in series with a diode D8–D11. The polarity switch and diode combinations are connected in opposing pairs in respective legs of the transformer T1 output. The AC output of the polarity circuit is connected to a filter including an inductor L2 and a capacitor C1. The LC filter L2, C1 filters the pulse width modulated output of the amplitude and polarity circuits to provide the desired output waveform.

Two polarity switch control transformers T4 and T5 are each provided with two sets of secondary windings. One leg of each transformer T4, T5 secondary is connected through a diode and an RC filter to the gate of a corresponding one of the polarity switches Q5–Q8. The other leg of the corresponding transformer T4, T5 is connected to the emitter of the respective polarity switch Q5–Q8. A bias voltage is applied to the primary side of the transformer T4, which is connected in series with two FETs Q9 and Q10. The bias voltage is also applied to the primary side of the transformer T5, which is connected in series with two FETs Q11 and Q12. Another FET Q13 is connected between the gate of FET Q12 and ground. The gates of FETs Q9 and Q11 are connected to a high frequency square wave generating oscillator. The gates of FETs Q10 and Q12 are connected to an output of the microcontroller that can provide an output shutdown signal. The output shutdown signal is normally high during operation. The gates of FETs Q10 and Q13 are connected to a polarity switch output of the microcontroller 36.

When the microcontroller 36 sets the AC output to zero, the microcontroller also changes the digital state of its polarity switch output. If it was high, it becomes low. If it was low, it becomes high. This results in either FET Q10 or FET Q12 being on, but not both. The FETs Q9 and Q11 are continuously driven by the high frequency oscillator. Thus, either transformer T4 or transformer T5 is active, but not both. The square waves generated by the transformers T4 and T5 are averaged to a DC level by the corresponding diode and RC filter on each output winding. These DC voltages will turn on either the combination of polarity switches Q5 and Q8 or the combination of polarity switches Q6 and Q7. The corresponding diodes D8–D11 rectify the output of the phase shifted full bridge as either a positive or a negative voltage.

When the output is to be zero volts, FETs Q12 and Q10 are disabled by pulling the output shutdown signal to low, which prevents operation of the transformers T4 and T5. This turns off all of the polarity switches Q5–Q8.

A transorb D12 connected across the AC output dissipates residual energy left in the inductor L2 when transistors Q5–Q8 are all off. The dissipation period can be extended as necessary according to the inductor L2 and filter capacitor C1 values. A disconnect switch S2 is located downstream of the falling edge bleeder 37. A surge circuit 48 absorbs fast electrical transients that could damage downstream circuitry.

Figure 5:
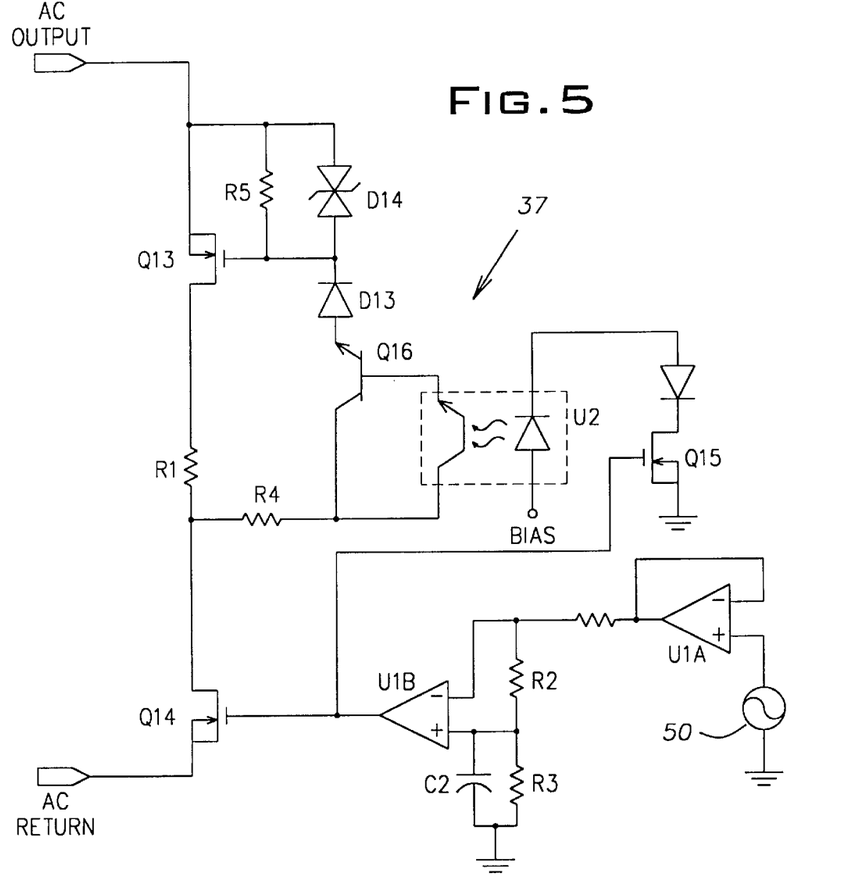
FIG. 5 shows a schematic diagram of the falling edge bleeder of the power supply.

Referring to FIGS. 3B and 5, the falling edge bleeder 37 includes a bleed resistor R1 connected across the AC output of the full bridge converter 28. A pair of FETs Q13, Q14 are connected in series with the bleed resistor R1. A sensing voltage signal 50 representing the desired AC output voltage of the full bridge converter 28 is fed through a buffer U1A to the inverting input of an op amp U1B. The output of the buffer U1A is attenuated by a voltage divider R2, R3 and fed to the non-inverting input of the op amp U1B. A capacitor C2 connected in parallel with the resistor R3 slows the response of the voltage divider R2, R3. The output of the op amp U1B is fed to the gate of the FET Q14 and the gate of another FET Q15. The FET Q15 is connected to the diode of an optocoupler U2. The optocoupler U2 is connected to operate a transistor Q16. The transistor Q16 emitter is connected to the gate of FET Q13 through a diode D13. A 14 volt bipolar transorb D14 is connected between the AC output and the gate of the FET Q13.

If the AC output voltage is controlled to move toward zero at a rate exceeding a maximum rate determined by the voltage divider R2, R3 and the capacitor C2, the output of the operational amplifier U1B output will go high. This turns on the FET Q14. It also turns on the FET Q15, which pulls current through the light emitting diode of the optocoupler U2. If the AC output voltage is positive, current flows through the parasitic body diode of Q13. This places the bleed resistor R1 in parallel with the AC output. The diode D13 prevents current from flowing through the transistor of optocoupler U2 and prevents harmful voltages from being impressed upon the transistor Q16 and the optocoupler U2. If the AC output voltage is negative, then current flows through the FET Q14, a current limiting resistor R4, and the transistor of the optocoupler U2. This turns on the transistor Q16, which feeds a current through the diode D13 and the parallel combination of resistor R5 and the transorb D14. This places a voltage on the gate of the FET Q13 from its gate to its source, which is limited to the breakdown voltage of the bipolar transorb D14. This turns on the FET Q13 and places the bleed resistor R1 in parallel with the AC output. Directing current through the bleed resistor R1 accelerates the movement of the output voltage toward zero to discharge residual energy. This permits the actual output voltage to more closely follow the desired output voltage set by the microcontroller. In many cases, the desired output voltage will ramp toward zero more quickly than the actual voltage during every half cycle. Thus, the falling edge bleeder might be activated every half cycle.

When the AC output voltage begins to rise again, the voltage at the inverting input of the op amp U1B will exceed the time delayed voltage at the non-inverting input. The output of the op amp U1B will go low, which turns off the FETs Q13 and Q14. If the AC output voltage is positive, the full AC output voltage appears across the FET Q14. If the AC output voltage is negative, the full output voltage appears across FET Q13. No current will flow between the AC output and return.

Thus, the amplitude circuit controls output voltage amplitude and the polarity circuit controls output voltage polarity. The falling edge bleeder ensures that a quickly declining output voltage magnitude follows the desired waveform. Frequency is determined by the rate at which the polarity circuit changes the output polarity. Normally, the amplitude circuit ramps the voltage down before polarity is changed. Smoothly synchronized microcontroller operation of the gate drivers and polarity switches generates a precise AC waveform of arbitrary shape at the output of the power supply. For example, to obtain an output waveform having a trapezoidal shape, full voltage is maintained by a relatively high duty cycle on the amplitude circuit output. The LC filter L2, C1 provides a DC output voltage magnitude corresponding with the pulse width modulated voltage of the amplitude circuit. For 60 Hz operation, the voltage is set to zero and the polarity changed every 1/120th of a second. Before the voltage is set to zero, the duty cycle of the inverter amplitude circuit is reduced in steps to obtain a downward sloping ramp on the output of the power supply. The falling edge bleeder dissipates energy to ensure that the output voltage decays at the correct rate. After reaching zero, the polarity circuit changes the output polarity. Then, the output voltage is ramped down to full negative voltage by increasing the inverter duty cycle. Operation continues in this manner to obtain the desired output waveform.

Figure 6:
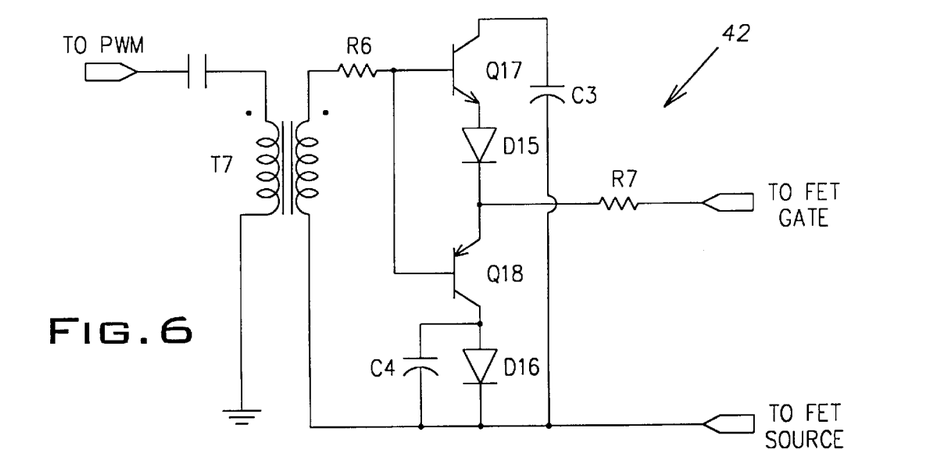
FIG. 6 shows a schematic diagram of the FET gate driver of the power supply.

Referring to FIGS. 3A and 6, each FET driver 42 includes a transformer T7 having its primary connected between the pulse width modulator 44 output (via the corresponding power booster 43) and ground. The input from the PWM 44 is a 50% duty cycle square wave. The secondary of the transformer T7 is connected through a resistor R6 to the respective bases of two transistors Q17, Q18. One of the transistors Q17 is an NPN type and the other transistor Q18 is a PNP type. The emitter of the NPN transistor Q17 is connected to the gate of the corresponding FET Q1, Q2, Q3, or Q4 through a diode D15 and a resistor R7. The collector of this transistor Q17 is connected to the FET source through a capacitor C3. The emitter of the PNP transistor Q18 is connected to the gate of the corresponding FET through the resistor R7. The collector of this transistor Q18 is connected to the FET source through a capacitor C4 and diode D16 connected in parallel.

The FET driver 42 has two modes of operation: steady state and initial state. During steady state operation, when the voltage across the secondary of transformer T7 goes from negative to positive, the NPN transistor Q17 is forward biased from base to emitter. This pulls current from the capacitor C3 through the transistor Q17, the diode D15, and the resistor R7 to the gate of the FET. Simultaneously, the PNP transistor Q18 is reverse biased from base to emitter and turns off. The FET gate voltage will then rise to the level to which the capacitor C3 is charged. After reaching the voltage of the capacitor C3, the energy removed from the capacitor C3 to charge the FET is restored to the capacitor C3 through the base-collector PN junction in the transistor Q17. Eventually, the transformer T7 reverses polarity again, going from positive to negative. Then, the NPN transistor Q17 is reverse biased from base to emitter and turns off. The PNP transistor Q18 is forward biased from emitter to base. The capacitor C4 is charged to a negative voltage with respect to the FET source. Current flows from the gate of the FET, through the resistor R7 and transistor Q18, and into the capacitor C4. The capacitor C4 becomes slightly less negative in this process. After the FET gate is at its maximum negative voltage, current flows though the collector-base PN junction in the transistor Q18, through the resistor R6 and transformer T7 secondary, and back to the capacitor C4, restoring the capacitor C4 to its previous level of negative voltage. This process then repeats as the polarity of the transformer T7 continues to alternate.

During the initial state mode when the FET driver 42 is started, the capacitors C3 and C4 are completely discharged. When the voltage on the transformer T7 secondary first goes positive, all the charge flowing though the resistor R7 flows from the transformer T7 through the diode D15 and the base-emitter junction of the transistor Q17. This will result in a low rate of rise on the waveform and a slow turn on of the FET as compared to the steady state operation. As the corresponding FET gate slowly charges, the capacitor C3 also charges. All the energy being pulled out of the FET gate flows through the emitter-base junction of Q18, the resistor R6, and the transformer T7 secondary. This results in a slow turn off of the FET. As the FET turns off, the capacitor C4 gradually charges to a negative voltage. Once the capacitors C3 and C4 are both charged to their full normal potential, the circuit works in the steady state mode described above.

Figure 7:
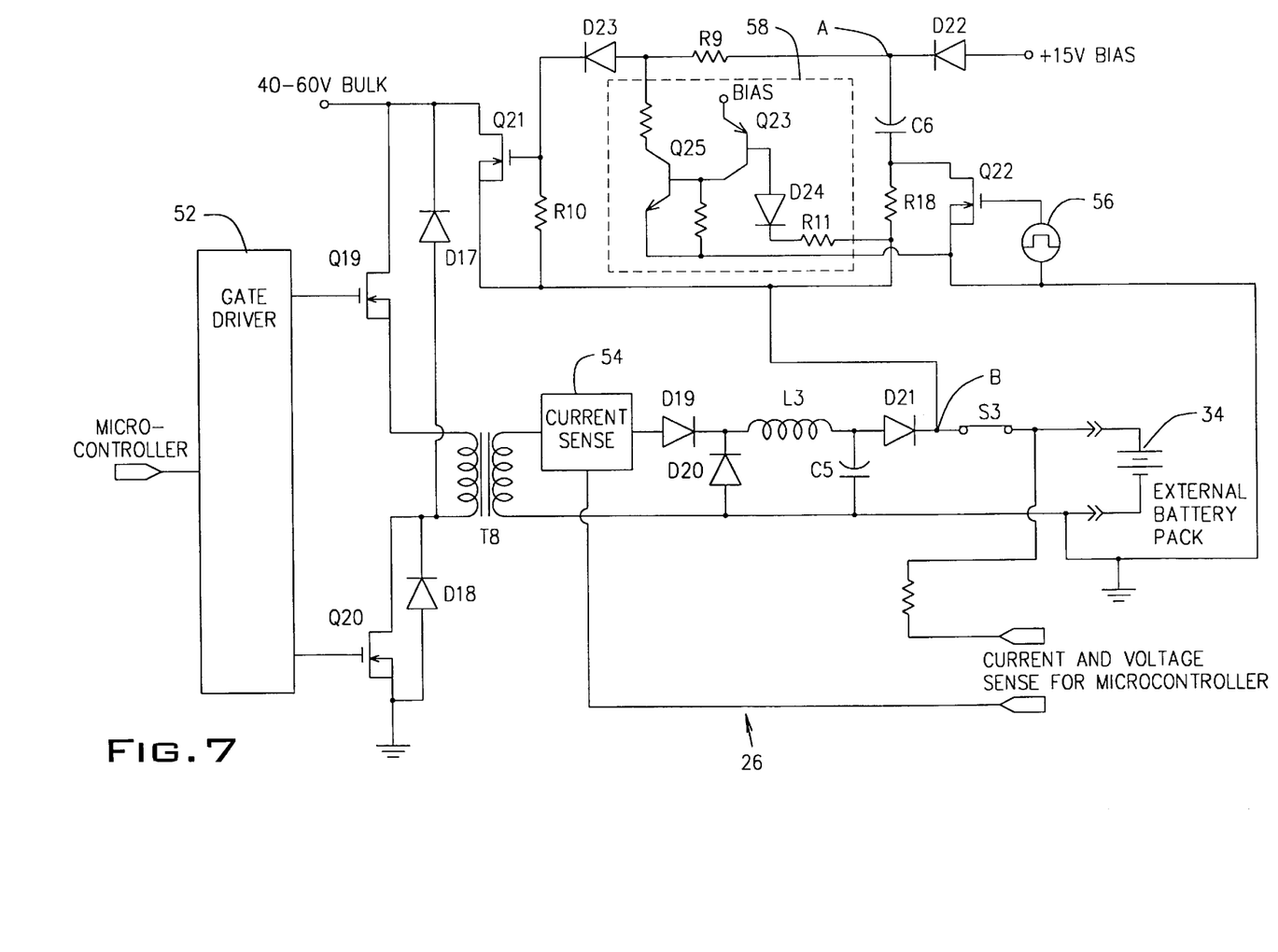
FIG. 7 shows a schematic diagram of the battery charger and discharger of the power supply.

Referring to FIGS. 2 and 7, the battery charger/discharger 26 includes a charging circuit and a discharging circuit. The charging circuit is a forward converter battery charger including two charging FETs Q19, Q20 operated by a microcontroller controlled gate driver 52. The charging FETs Q19, Q20 are connected between the inverter bulk power and ground via the primary of a charging transformer T8. Voltage clamping diodes D17, D18 are connected to the drains of the charging FETs Q19, Q20. A current sensor 54 is connected to the secondary of the charging transformer. The transformer output is rectified by a diode D19 and smoothed by an inductor L3 and capacitor C5. A freewheeling diode D20 and ORing diode D21 are also provided in the charging circuit. The ORing diode D21 prevents current flow into the battery charging circuit when an external battery charger is connected to the battery. A battery disconnect switch S3 is provided to isolate the battery 34 from the charging and discharging circuits. A voltage sensing line is connected from the battery to the microcontroller. This battery charger is capable of charging 36V or 48V nominal battery strings at a rate of 10A. The battery output is normally maintained at about 41 to 54 volts. The microcontroller is connected to receive line voltage information from the power factor corrector. When the power supply loses AC power on the main line, the charger is disabled, and the battery discharge circuit is activated.

The discharging circuit includes discharge FET Q21 connecting the battery to the inverter bulk power through the disconnect switch S3. In FIG. 2, the discharge FET Q21 is schematically shown as the parallel combination of the switch S1 and diode D1. If the inverter bulk drops below the battery voltage, the body diode of discharge FET Q21 will forward bias, thus current will flow from the battery to sustain the inverter bulk voltage.

When the AC bulk voltage is lost or falls too low, the PFC sends a low voltage signal to the microcontroller, which then starts an oscillator 56. The oscillator 56 drives control FET Q22. When the control FET Q22 is on, capacitor C6 is charged to the bias voltage (nominally 15 volts) though diode D22. When the control FET Q22 is off, its drain to source capacitance is charged to the battery voltage via resistor R8. Thus, the voltage at node A is held higher than the battery voltage. Current then flows from the capacitor C6, through resistor R9, and diode D23, into the gate capacitance of the discharge FET Q21. When the control FET Q22 is turned on again, diode D23 prevents the gate of discharge FET Q21 from losing the stored charge immediately. Thus, the discharge FET Q21 is turned on if the failure of the AC power line to maintain the inverter bulk voltage is more than a transient condition. The repeated charging and discharging of the capacitor C1 by the oscillator 56 maintains sufficient voltage at the gate of the discharge FET Q21 to hold the discharge FET on.

When the AC line voltage is restored, but before the inverter bulk voltage is supported by the full bridge inverter 22 again, the oscillator 56 is stopped by the microcontroller. The capacitor C6 no longer delivers charge to discharge FET Q21. The voltage on the gate of discharge FET Q21 decays slowly through resistor R10. Once the gate voltage drops below the threshold voltage of discharge FET Q21, the FET turns off and current flow through the discharge FET shifts from the switch S1 to its intrinsic body diode D1. This state continues until the power supply is fully restored to normal operation so the inverter bulk voltage exceeds the battery voltage. Thus, the body diode is reverse biased and there is no current flow through the discharge FET Q21. The battery charger is then restarted, and normal operation commences.

The battery discharger is provided with a protection circuit 58. If the output of the battery charger, node B, for example, is shorted out, the voltage at the battery output will drop below a protection circuit bias voltage. When this occurs, current flows through transistor Q23 from its emitter to its base. The base current flows through diode D24 and resistor R11 to the battery output. This will feed current into transistor Q25, which pulls the anode of diode D23 to ground. This holds the discharge FET Q21 off in a short circuit condition and prevents current from the inverter bulk voltage from flowing into the short circuit. Diode D24 prevents damage to transistor Q23 under normal operating conditions.

Figure 8:
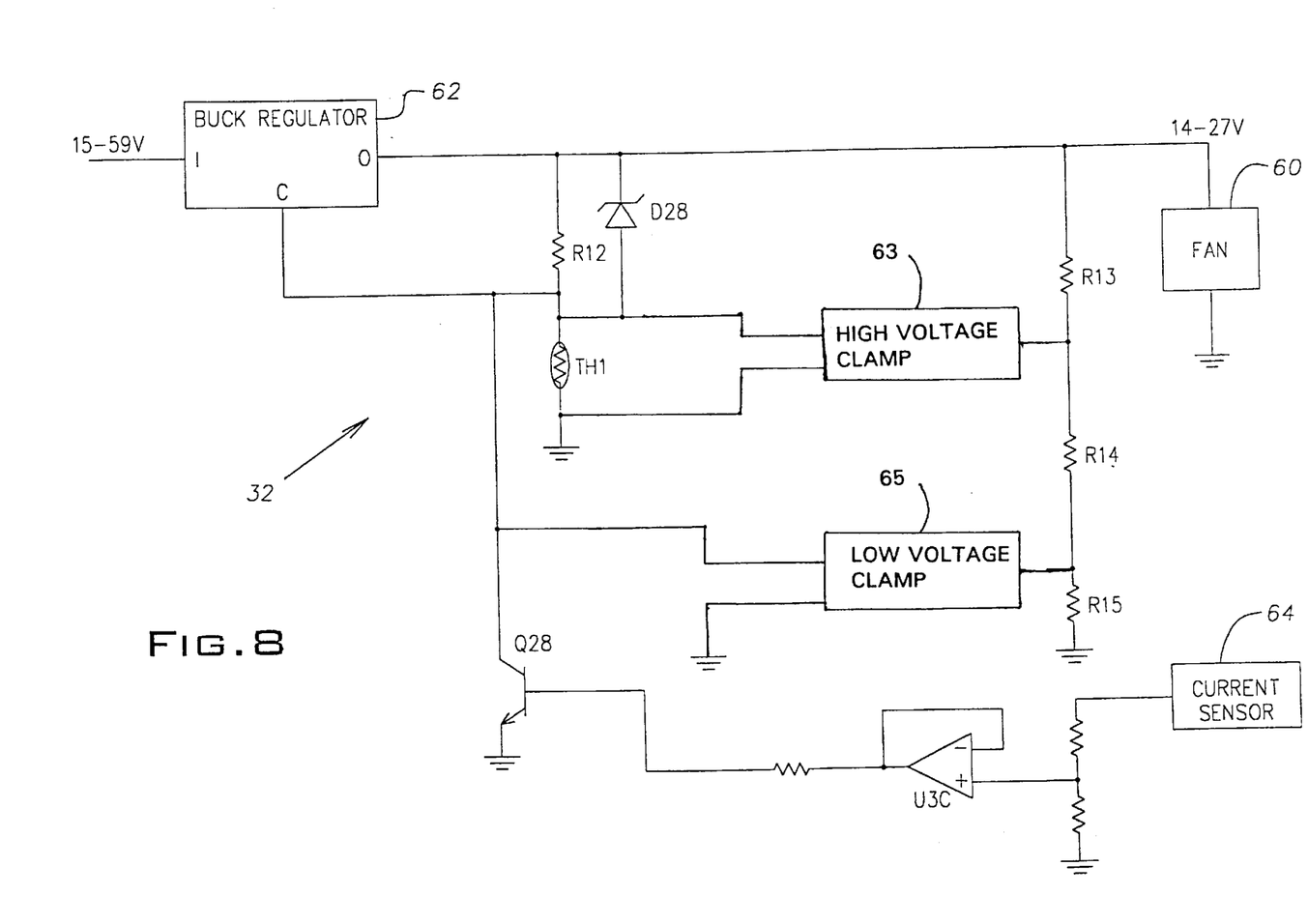
FIG. 8 shows a schematic diagram of the fan voltage regulator and speed control of the power supply.

Referring to FIG. 8, the fan controller 32 operates a cooling fan 60 for the power supply. The fan controller 32 includes a buck regulator 62 used to set a fan voltage in a range of 14 to 27 VDC. Voltage at the output O of the regulator 62 is fed back to the control input C through a resistor R12. A negative temperature coefficient, temperature dependent resistor, such as a thermistor TH1, is connected between the control input C and ground. The thermistor TH1 monitors power supply temperature. As the power supply temperature increases, the resistance of the thermistor TH1 decreases. This pulls down the voltage at the regulator control input C, which causes the regulator to increase the voltage to the fan. Thus, as the power supply temperature increases, the fan speed increases. Similarly, as the power supply temperature decreases, the fan speed decreases.

High voltage and low voltage clamps 63, 65 clamp the regulator output voltage within upper and lower limits, respectively. If the output voltage exceeds a threshold determined by resistors R13, R14 and R15, then the high voltage clamp 63 feeds current into the thermistor TH1, which maintains the regulator control input voltage at a level clamping the regulator output voltage to the high rail (27 VDC). If the output voltage drops below a threshold determined by the resistors R13, R14, and R15, then the low voltage clamp 65 pulls current away from the thermistor TH1, which holds the regulator control voltage at a level maintaining a minimum output voltage.

A current sensor 64 is connected to sense output current of the power supply. A low pass filter U3C buffers an analog representation of the output current from the current sensor. The LP filter U3C feeds the current signal into transistor Q28. If the power supply current increases, representing increased load, the transistor Q28 reduces the voltage at the regulator control. This increases the regulator output voltage and increases the fan speed. If the power supply current decreases, representing decreased load, the transistor Q28 raises the voltage at the regulator control. This decreases the regulator output voltage and decreases the fan speed.

A zener diode D28 is an overvoltage protection diode. If the regulator output voltage exceeds the breakdown voltage of diode D28 plus the voltage across the thermistor TH1, then the diode D28 will conduct, which clamps the output voltage.

The present disclosure describes several embodiments of the invention, however, the invention is not limited to these embodiments. Other variations are contemplated to be within the spirit and scope of the invention and appended claims.

What is claimed is:

1. A power supply comprising:
    an inverter having a DC input and an AC output;
    a first DC voltage source connected to the DC input;
    a second DC voltage source connected to the DC input;
    a rectifier and a switch connected in parallel, wherein the rectifier and the switch are connected between the second voltage source and the DC input and wherein the switch has a control input;
    a capacitor having a first terminal connected to the switch control input and a second terminal connected to the second voltage source;
    a voltage applied to the first capacitor terminal;
    a second controlled switch connected between the second capacitor terminal and ground; and
    an oscillator connected to operate the second controlled switch when the first controlled switch is to be closed.

2. The power supply according to claim 1 wherein the inverter includes an amplitude circuit connected to control amplitude of the voltage at the AC output and further comprising a controller connected to operate the amplitude circuit and the polarity circuit so as to obtain a desired waveform at the AC output.

3. A power supply comprising:
    an inverter having a DC input and an AC output, wherein the inverter includes an amplitude circuit connected to control amplitude of the voltage at the AC output and a polarity circuit connected to control polarity of the voltage at the AC output; and
    a controller connected to operate the amplitude circuit and the polarity circuit so as to obtain a desired waveform at the AC output.

4. The power supply according to claim 3 wherein the amplitude circuit includes controlled switches connected and operable to generate a pulse width modulated signal.

5. The power supply according to claim 4 wherein the polarity circuit is connected to receive the pulse width modulated signal and control the polarity of the AC output.

6. The power supply according to claim 5 further comprising a transformer connected to transfer energy from the amplitude circuit to the polarity circuit.

7. The power supply according to claim 3 further comprising:
    a first DC voltage source connected to the DC input;
    a second DC voltage source connected to the DC input; and
    a rectifier and a switch connected in parallel, wherein the rectifier and the switch are connected between the second voltage source and the DC input.

8. The power supply according to claim 7 wherein the switch is controlled so as to close when the second DC voltage source supplies power to the inverter and to open when the first DC voltage source supplies power to the inverter.

9. The power supply according to claim 7 wherein the switch has a control input and further comprising a switch control circuit including:
    a capacitor having a first terminal connected to the switch control input and a second terminal connected to the second voltage source;
    a voltage applied to the first capacitor terminal;
    a second controlled switch connected between the second capacitor terminal and ground; and
    an oscillator connected to operate the second controlled switch when the first controlled switch is to be closed.

10. The power supply according to claim 7 wherein the switch is a FET and the rectifier is a body diode of the FET.

11. The power supply according to claim 10 wherein the first DC voltage source is a full bridge DC-DC converter and the second DC voltage source is a battery.

12. The power supply according to claim 11 wherein the battery is charged by the first DC voltage source.

13. The power supply according to claim 5 wherein the amplitude circuit provides a voltage across first and second amplitude circuit terminals and the polarity circuit includes a first pair of rectifiers connected in parallel and in opposition between the first amplitude circuit terminal and the power supply output, a second pair of rectifiers connected in parallel and in opposition between the second amplitude circuit terminal and the power supply output, and a respective controlled polarity switch connected in series with each of the rectifiers, the polarity switches being controlled so that only one of the polarity switches corresponding to each diode pair is closed at any time.

14. The power supply according to claim 13 wherein the polarity circuit includes a controller for operating the controlled polarity switches such that one of the polarity switches corresponding with the first pair of rectifiers is operated coincidentally with one of the polarity switches corresponding with the second pair of rectifiers.

15. The power supply according to claim 14 wherein the switches operated coincidentally correspond with rectifiers connected to permit current flow to a single node.

16. The power supply according to claim 13 wherein the polarity circuit controller includes two transformers, wherein one of the transformers is connected to control two of the polarity switches corresponding with rectifiers connected to permit current flow to a single node and the other of the transformers is connected to control two other of the polarity switches.

17. The power supply according to claim 16 wherein the polarity circuit controller includes an oscillator connected to control current through the transformer and a polarity signal connected to control current through the transformer, wherein the polarity signal is connected to ensure that only one of the two transformers is on at the same time.

18. The power supply according to claim 16 wherein the polarity circuit controller includes a respective rectifier and filter connected between each polarity switch and the corresponding transformer.

19. The power supply according to claim 16 wherein the polarity circuit controller includes a shut down circuit connected to selectively block current flow through the transformers.

20. The power supply according to claim 13 wherein the amplitude circuit includes controlled switches connected and operable to generate a pulse width modulated signal at the amplitude circuit terminals.

21. The power supply according to claim 20 wherein the polarity circuit is connected to receive the pulse width modulated signal and control the polarity of the AC output by operation of the polarity switches.

22. The power supply according to claim 13 wherein the terminals are output terminals of a transformer.

23. The power supply according to claim 22 wherein the transformer includes a center tap connected to ground.

24. The power supply according to claim 3 wherein the inverter includes an energy dissipator selectively connected across the output of the power supply.

25. The power supply according to claim 3 wherein the inverter includes a bleeder resistor selectively connected across the output of the power supply.

26. The power supply according to claim 25 further comprising a switch for selectively connecting the bleeder resistor across the output of the power supply and a bleeder control circuit for operating the switch wherein the bleeder control circuit is connected to permit current flow through the bleeder resistor when voltage at the AC output exceeds a desired amplitude.

27. The power supply according to claim 25 further comprising a switch for selectively connecting the bleeder resistor across the output of the power supply and a bleeder control circuit for operating the switch wherein the bleeder control circuit is connected to permit current flow through the bleeder resistor when voltage at the AC output is ramping toward zero volts.

28. The power supply according to claim 3 further comprising:
- a resistor connected across the power supply output; and
- a controlled switch connected in series with the resistor and operated responsive to a voltage across the power supply output to close the switch when the output voltage amplitude exceeds a specified value.

29. The power supply according to claim 3 further comprising:
- a resistor connected across the power supply output; and
- a controlled switch connected in series with the resistor and operated responsive to a voltage across the power supply output to close the switch when the output voltage amplitude is ramping toward zero volts.

30. The power supply according to claim 3 wherein the amplitude circuit includes controlled switches for controlling current determining the output of the amplitude circuit and a gate driver for each controlled switch wherein the gate driver comprises:
- a controller connected to provide a voltage to a control terminal of the controlled switch; and
- an energy storage device connected to apply a voltage to a control terminal of the switch when the controlled switch is to be closed and to discharge a voltage from the control terminal switch when the controlled switch is to be opened.

31. The power supply according to claim 30 further comprising a transformer connected between the controller and the controlled switch wherein the controller is a pulse width modulator.

32. The power supply according to claim 30 wherein the energy storage device comprises a first capacitor connected to apply the voltage to the control terminal of the controlled switch and a second capacitor connected to discharge the voltage from the control terminal of the controlled switch.

33. The power supply according to claim 32 wherein the controlled switch is a FET and the first capacitor is connected between a gate and a source of the FET by a second controlled switch that is closed when the controller applies a positive voltage to the gate and the second capacitor is connected between the gate and the source of the FET by a third controlled switch that is closed when the controller applies a negative voltage to the gate.

34. The power supply according to claim 3 wherein the amplitude circuit includes a FET having a gate and a source for controlling output voltage and further comprising a gate driving circuit for controlling the FET comprising:
- a first capacitor connected between the gate and the source;
- a first switch connected in series with the first capacitor;
- a second capacitor connected between the gate and the source; and
- a second switch connected in series with the second capacitor, wherein the first and second switches are turned on alternately so that when the first switch is closed, a charge on the first capacitor applies a voltage to the gate and when the second switch is closed, the second capacitor discharges a voltage from the gate.

35. A battery discharge circuit for connecting a battery to a load comprising:
- a diode connected between the battery and the load;
- a controlled switch connected in parallel with the diode, the switch having a control input; and
- a switch control circuit comprising:
  - a capacitor having a first terminal connected to the switch control input and a second terminal connected to the battery;
  - a voltage applied to the first capacitor terminal;
  - a second controlled switch connected between the second capacitor terminal and ground; and
  - an oscillator connected to operate the second controlled switch when the first controlled switch is to be closed.

36. A gate driver comprising:
- a FET having a gate and a source;
- a first capacitor connected between the gate and the source;
- a first switch connected in series with the first capacitor;
- a second capacitor connected between the gate and the source; and
- a second switch connected in series with the second capacitor, wherein the first and second switches are turned on alternately so that when the first switch is closed a charge on the first capacitor applies a voltage to the gate and when the second switch is closed the second capacitor discharges a voltage from the gate.

* * * * *

UNITED STATES PATENT AND TRADEMARK OFFICE
CERTIFICATE OF CORRECTION

PATENT NO.   : 6,359,794 B1
DATED        : March 19, 2002
INVENTOR(S)  : Richmond Andrew Real It is certified that error appears in the above-identified patent and that said Letters Patent is hereby corrected as shown below:

<u>Column 12,</u>
Line 19, please delete "claim 5" and insert therefor -- claim 3 --.

Signed and Sealed this

Seventeenth Day of December, 2002

JAMES E. ROGAN
*Director of the United States Patent and Trademark Office*